(12) United States Patent
Soukup (10) Patent No.: US 7,613,179 B2
(45) Date of Patent: Nov. 3, 2009

(54) TECHNIQUE FOR TRACING SOURCE ADDRESSES OF PACKETS

(75) Inventor: Martin Soukup, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 832 days.

(21) Appl. No.: 10/721,335

(22) Filed: Nov. 26, 2003

(65) Prior Publication Data

US 2005/0111447 A1    May 26, 2005

(51) Int. Cl.
*H04L 12/28* (2006.01)
(52) U.S. Cl. .............................. 370/389; 726/13; 726/23
(58) Field of Classification Search ................. 370/389, 370/392; 726/13, 22, 23, 25
See application file for complete search history.

(56) References Cited

U.S. PATENT DOCUMENTS

| | | | | |
|---|---|---|---|---|
| 5,828,846 | A * | 10/1998 | Kirby et al. ................. | 709/238 |
| 6,665,297 | B1 * | 12/2003 | Hariguchi et al. ........... | 370/392 |
| 2002/0147925 | A1 * | 10/2002 | Lingafelt et al. ............ | 713/201 |
| 2003/0110274 | A1 * | 6/2003 | Pazi et al. ................... | 709/229 |
| 2004/0059944 | A1 * | 3/2004 | Stademann ................. | 713/201 |
| 2004/0064737 | A1 * | 4/2004 | Milliken et al. ............. | 713/201 |
| 2004/0123142 | A1 * | 6/2004 | Dubal et al. ................ | 713/201 |
| 2007/0002769 | A1 * | 1/2007 | Matityahu et al. ........... | 370/255 |

OTHER PUBLICATIONS

Peng et al., "Detecting Distributed Denial of Service Attacks Using Source IP Address Monitoring", ARC Special Research Center for Ultra-Broadband Information Networks, pp. 1-14.*
Stefan Savage, David Wetherall, Anna Karlin and Tom Anderson, "Practical Network Support for IP Traceback," SIGCOMM'00, Stockholm, Sweden.
Cheng Jin, Haining Wang and Kang G. Shin, "Hop-Count Filtering: An Effective Defense Against Spoofed DDoS Traffic," Proceedings of the $10^{th}$ ACM conference on computer and communication security, pp. 30-41.
T. Peng, C. Leckie and K. Ramamohanarao, "Detecting Distributed Denial of Service Attacks Using Source IP Address Monitoring," The University of Melbourne—Dept. of Electrical and Electronic Engineering Technical Report, Nov. 2002.
T. Peng, C. Leckie and K. Ramamohanarao, "Detecting Distributed Denial of Service Attacks by Sharing Distributed Beliefs," $8^{th}$ Australasian Conference on Information Security and Privacy, Wollongong, Australia, Jul. 2003.

(Continued)

*Primary Examiner*—Jayanti K Patel
*Assistant Examiner*—Bo Hui A Zhu
(74) *Attorney, Agent, or Firm*—Hunton & Williams, LLP (57) ABSTRACT

A technique for tracing source addresses of packets is provided. In one particular exemplary embodiment, the technique may be realized by/as a method for tracing source addresses of packets. The method comprises identifying at least part of a source address of a packet and determining whether the at least part of the source address matches at least one source address recorded within a predetermined time period prior to arrival of the packet.

21 Claims, 3 Drawing Sheets

OTHER PUBLICATIONS

Sven Dietrich, "Scalpel, Gauze, and Decompilers Dissecting Denial of Service (DDoS)," ;login: The Magazine of Usenix & Sage, Nov. 2000, vol. 25, No. 7, pp. 52-55.

J. Li, Mirkovic, M. Wang, P. Reiher, and L. Zhang, "SAVE: Source Address Validity Enforcement Protocol," INFOCOM 2002.

D. Fasulo, "An Analysis of Recent Work on Clustering Algorithms," University of Washington—Department of Computer Science & Engineering Technical Report # 01-03-02, Apr. 26, 1999.

Al Reuben, "Re: Average and median IP packet size over the Internet?" found at http://www.cctec.com/maillists/nanog/historical/9804/msg00547.html.

* cited by examiner

TECHNIQUE FOR TRACING SOURCE ADDRESSES OF PACKETS

FIELD OF THE INVENTION

The present invention relates generally to computer and communications networks and, more particularly, to a technique for tracing source addresses of packets.

BACKGROUND OF THE INVENTION

Denial of Service (DoS) attacks, especially Distributed Denial of Service (DDoS) attacks, pose a serious threat to the availability of internet services. DoS attacks typically consume the resources of a remote host or network, thereby limiting and/or blocking legitimate users' access. Such attacks can result in significant loss of time and money for many organizations.

DDoS attacks are among the hardest network security problems because they are simple to implement, difficult to prevent, and very difficult to trace. In order to conceal the origins of attacks and to coax uncompromised hosts into becoming reflectors, DDoS attackers typically spoof their IP packets by randomizing the source address fields. Further, an attacker need not be operating from a single machine; he may be able to coordinate several machines on different networks to launch the attacks.

Many solutions have been proposed to prevent and/or trace DDoS attacks. However, these solutions suffer from a number of deficiencies. For example, some solutions propose new protocols or mechanisms to be implemented on all network routers, which is difficult to achieve. Some solutions rely on statistical methods and models, and therefore are likely to produce many false positives.

In view of the foregoing, it would be desirable to provide a technique for preventing and/or tracing DoS attacks which overcomes the above-described inadequacies and shortcomings.

SUMMARY OF THE INVENTION

According to the present invention, a technique for tracing source addresses of packets is provided. In one particular exemplary embodiment, the technique may be realized by/as a method for tracing source addresses of packets. The method comprises identifying at least part of a source address of a packet and determining whether the at least part of the source address matches at least one source address recorded within a predetermined time period prior to arrival of the packet.

In accordance with one aspect of this particular exemplary embodiment, the at least one source address may be recorded in a hierarchical data structure.

In accordance with another aspect of this particular exemplary embodiment, a Last Time Seen (LTS) value associated with each of the at least one source address may be recorded.

In accordance with yet another aspect of this particular exemplary embodiment, the method may further comprise routing the packet if the at least part of the source address matches at least one source address recorded within the predetermined time period prior to the arrival of the packet and recording an arrival time of the packet.

In accordance with still another aspect of this particular exemplary embodiment, the method may further comprise routing the packet with a warning if the at least part of the source address does not match at least one source address recorded within the predetermined time period prior to the arrival of the packet and recording the at least part of the source address and an arrival time of the packet. The warning may be recorded in a read-only medium.

In accordance with a further aspect of this particular exemplary embodiment, the method may further comprise issuing a warning and discarding the packet if the at least part of the source address does not match at least one source address recorded within the predetermined time period prior to the arrival of the packet. The warning may be recorded in a read-only medium.

In accordance with a still further aspect of this particular exemplary embodiment, the source address of the packet may be an internet protocol (IP) address.

In accordance with another exemplary embodiment, the technique may be realized as at least one signal embodied in at least one carrier wave for transmitting a computer program of instructions configured to be readable by at least one processor for instructing the at least one processor to execute a computer process for performing the method as recited above.

In accordance with yet another exemplary embodiment, the technique may be realized as at least one processor readable carrier for storing a computer program of instructions configured to be readable by at least one processor for instructing the at least one processor to execute a computer process for performing the method as recited above.

In accordance with still another exemplary embodiment, the technique may be realized by a system for tracing source addresses of packets comprising at least one network element. The at least one network element may comprise a processor module that identifies at least part of a source address of a packet and determines whether the at least part of the source address matches at least one source address recorded within a predetermined time period prior to arrival of the packet. The at least one network element may also comprise a storage module that stores the at least one source address recorded within a predetermined time period prior to arrival of the packet.

In accordance with one aspect of this particular exemplary embodiment, the at least one source address may be recorded in a hierarchical data structure.

In accordance with another aspect of this particular exemplary embodiment, a Last Time Seen (LTS) value associated with each of the at least one source address may be recorded.

In accordance with yet another aspect of this particular exemplary embodiment, the processor module may be further adapted to route the packet if the at least part of the source address matches at least one source address recorded within the predetermined time period prior to the arrival of the packet and record an arrival time of the packet.

In accordance with still another aspect of this particular exemplary embodiment, the processor module may be further adapted to route the packet with a warning if the at least part of the source address does not match at least one source address recorded within the predetermined time period prior to the arrival of the packet and record the at least part of the source address and an arrival time of the packet. The warning may be recorded in a read-only medium.

In accordance with a further aspect of this particular exemplary embodiment, the processor module may be further adapted to issue a warning and discard the packet if the at least part of the source address does not match at least one source address recorded within the predetermined time period prior to the arrival of the packet. The warning may be recorded in a read-only medium.

In accordance with a still further aspect of this particular exemplary embodiment, the source address of the packet may be an internet protocol (IP) address.

In accordance with still another exemplary embodiment, the technique may be realized by a system for tracing source addresses of packets. The system may comprise means for identifying at least part of a source address of a packet and means for determining whether the at least part of the source address matches at least one source address recorded within a predetermined time period prior to arrival of the packet.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF EXEMPLARY EMBODIMENT(S)

Figure 1:
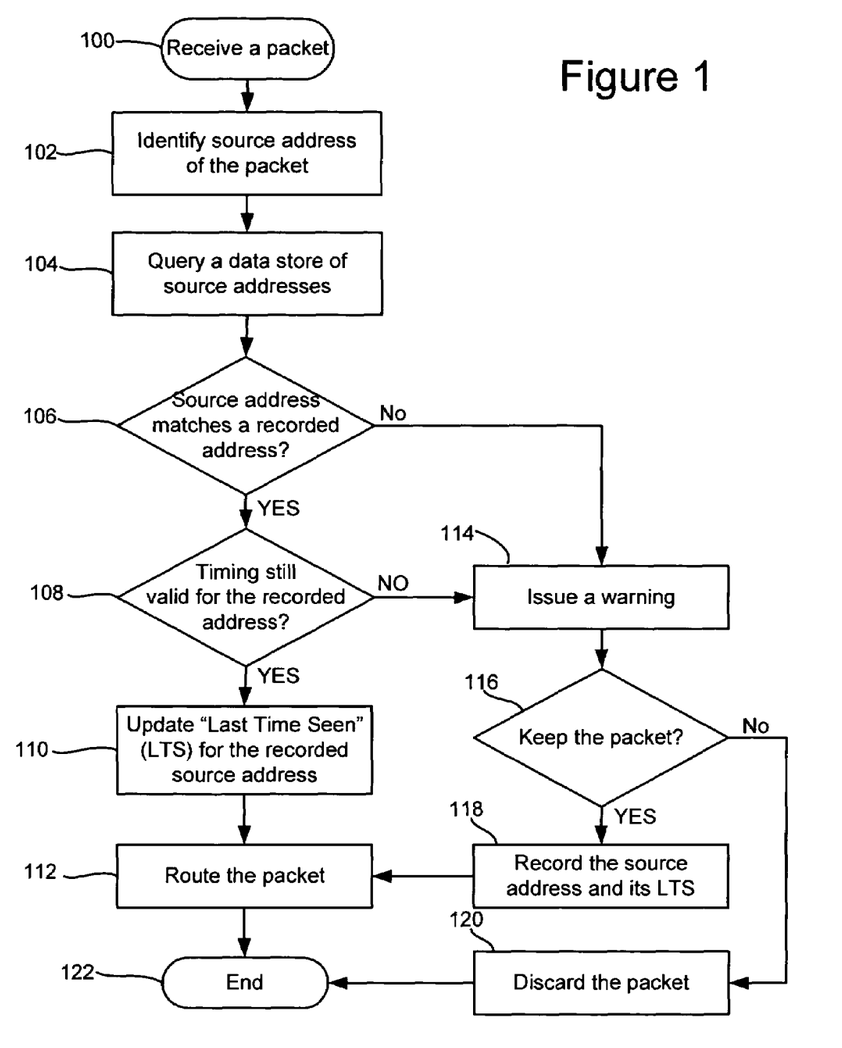
FIG. 1 is a flow chart illustrating an exemplary method for tracing source addresses of packets in accordance with the present invention.

Referring to FIG. 1, there is shown a flow chart illustrating an exemplary method for tracing source addresses of packets in accordance with the present invention.

The exemplary method starts in step 100 where a signal packet may be received by a network element. The network element may be a computer, a server, or a content-aware switch/router having one or more connections to a computer and/or communications network. For illustration purposes, the signal packet is hereinafter referred to as "Packet X."

In step 102, at least part of a source address of Packet X may be identified. The source address may be an identifier string or number, embedded in the packet, that identifies the origin (or sender) of the packet. However, if the packet has been spoofed by a DDoS attacker, the source address may not reflect the true origin of the packet. To trace a packet, only part of its source address may be necessary. The partial or full source address of Packet X is hereinafter referred to as "Address X."

In step 104, a data store of source addresses may be queried. According to embodiments of the invention, the network element may maintain a data store of source addresses of packets it has received within a predetermined time period. The data store may be an in-memory type that accommodates high-speed access. Depending on desired applications, the recorded source addresses may be either partial or full addresses. The data store may also include a "Last Time Seen" (LTS) record for each of the recorded source addresses. A LTS for a particular source address may be a most recent time when a packet identified as originating from this source address was received. According to embodiments of the invention, the source addresses and their LTS records are typically organized in a hierarchical data structure.

In step 106, it may be determined whether Address X matches any source address recorded in the data store. If no source address is found in the data store that is same as or similar to Address X, Packet X may be from a suspicious origin and the process may branch to step 114.

If at least one recorded source address is found in the data store that is same as or similar to Address X, it may be determined in step 108 whether timing is still valid for the at least one recorded source address. Timing for a recorded source address is considered valid if the difference between its LTS and Packet X's arrival time is less than an "Allowed Age." If the timing is not valid for the at least one recorded source address, Packet X may be from a suspicious origin and the process may branch to step 114.

If the timing is still valid for the at least one recorded source address, it may be assumed that Packet X originated from a legitimate sender. Then, in step 110, the LTS for the at least one recorded source address may be updated based on Packet X's arrival time. In step 112, Packet X may be routed to its destination.

If Packet X is from a suspicious origin, as determined in steps 106 and 108, a warning may be issued in step 114. The issued warning may be recorded in a read-only medium. Then, in step 116, it may be determined whether to keep the packet. If, based on network security policy, it is desirable to discard a suspicious packet, Packet X may be discarded in step 120, the process of which is termed "black-holing." If the policy is to keep a suspicious packet, the data store of source addresses may be updated based on Address X and Packet X's arrival time before Packet X is routed in step 112.

The exemplary method ends in step 122.

The above description provides an overview of an exemplary method for tracing source addresses of packets. A more detailed description for tracing source addresses of internet protocol (IP) packets is set forth below in connection with FIG. 2.

Figure 2:
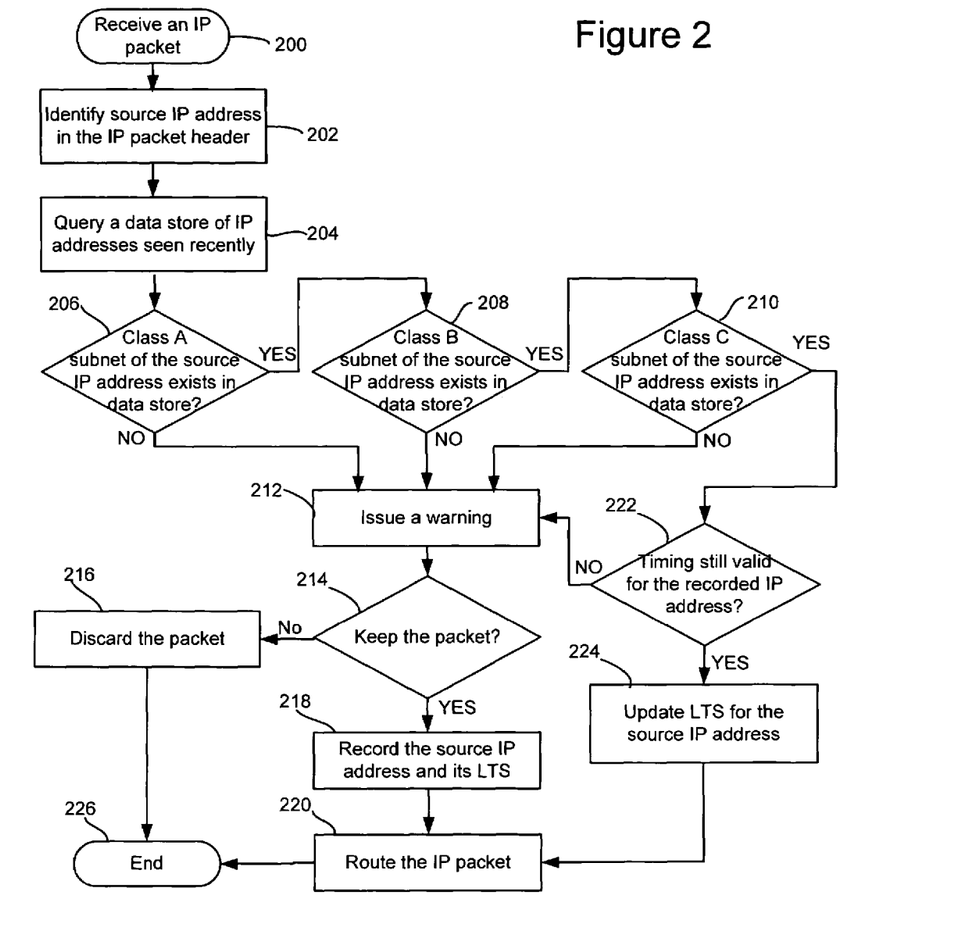
FIG. 2 is a flow chart illustrating another exemplary method for tracing source addresses of IP packets in accordance with the present invention.

Referring to FIG. 2, there is shown a flow chart illustrating another exemplary method for tracing source addresses of IP packets in accordance with the present invention.

The exemplary method starts in step 200 where an IP packet may be received by a network element. For illustration purposes, the IP packet is hereinafter referred to as "Packet Y."

In step 202, at least part of a source address of Packet Y may be identified in its header field(s). For example, in Internet Protocol Version 4 (IPv4), there is a 32-bit "source address" field in an IP packet's header. A similar yet longer (128-bit) field may be found in an Internet Protocol Version 6 (IPv6) packet. For illustration purposes, the exemplary method will be described with reference to an IPv4 packet though the method should be applicable to future versions of Internet Protocols including IPv6. The IPv4 source address of Packet Y will be hereinafter referred to as "Address Y."

In IPv4, a contiguous string of IP addresses form a subnet (short for "subnetwork"). A subnet may represent all the machines at one geographic location, in one building, or on the same local area network (LAN). Traditionally, subnets have been broken down into three size classes based on the four octets that make up an IP address. A Class A subnet is any subnet that shares the first octet. A Class B subnet is any subnet that shares the second octet. A Class C subnet is any subnet that shares the third octet. For example, IP address 124.69.2.32 may be considered a Class A 124 subnet, a Class B 124.69 subnet and a Class C 124.69.2 subnet.

In step 202, at least part of the IPv4 source address of Packet Y may be extracted from its header. According to embodiments of the invention, either part of the packet's IP address or its full address may be needed for tracing purposes. For example, sometimes it may only be necessary to identify the Class A, Class B and Class C subnets that Address Y belongs to.

In step 204, a data store of "recently seen" IP addresses may be queried. The network element may maintain a data store in which it records the source IP address and arrival time (i.e. "Last Time Seen" or LTS) of each packet that has been received in a predetermined time period. To minimize network impact of the tracing algorithm, it may be desirable to implement the data store in a high-speed memory or similar storage device. In the data store, the IP addresses and their associated LTS records may be organized in a hierarchical data structure based on their subnet classes. One example of the data store records is shown in Table 1. In Table 1, the first row records the Class A Subnet values; the second row records the Class B Subnet values based on their Class A classification; the third row records the Class C Subnet values based on their Class A and Class B classification; and the fourth row records the LTS values that correspond to the most recently seen Class C subnets.

For a better understanding of the operations in accordance with the present invention, two examples are set forth below with reference to Table 1.

In a first example, a packet with source IP address "47.128.185.158" arrives at a network router. In accordance with the exemplary methods described above, the router may extract the IP numbers from the packet's header field(s) and use the IP numbers to query a data store, part of which is exemplarily shown in Table 1. First, it is determined whether Class A subnet 47 exists in the data store. Yes, the number 47 is found in the "Class A Subnet" fields. Second, it is determined whether Class B subnet 128 exists underneath 47 in the data store hierarchy. Yes, the number 128 is found in the "Class B Subnet" field under Class A 47. Third, it is determined whether Class C subnet 185 exists underneath IP 47.128 in the data store hierarchy. Yes, the number 185 is found in the proper "Class C Subnet" field. Then, it is determined whether timing for IP address 47.128.185 is still valid. As shown in Table 1, the LTS for IP 47.128.185 is "Tue 11/11/2003 11:25:45 AM." Assume the packet's arrival time is "Tue 11/11/2003 6:55:31 PM" and the "Allowed Age" specified in the network security policy is 24 hours. Since less than the "Allowed Age"—24 hours—went by since a packet originating from IP 47.128.185 was last seen, the timing for

TABLE 1

Exemplary Data Store Records of Source IP Addresses.

| Class A Subnet | | 47 | | | | 129 | |
|---|---|---|---|---|---|---|---|
| Class B Subnet | 54 | 128 | 222 | | 15 | | 86 |
| Class C Subnet | 3 | 185 | 33 | 66 | | 67 | 96 |
| LTS | Mon Nov. 10, 2003 5:18:31 PM | Tue Nov. 11, 2003 11:25:45 AM | Tue Nov. 11, 2003 6:58:12 PM | Sun Nov. 9, 2003 9:20:00 AM | | Tue Nov. 11, 2003 12:10:45 PM | Sat Nov. 8, 2003 8:40:30 AM |

In steps 206 through 208, it may be determined whether Class A subnet, Class B subnet and Class C subnet identified in Address Y exist in the data store. If at least one of them is not found in the data store, Packet Y may be from a suspicious origin and the process may branch to step 212. If a recorded IP address is found that matches all three subnets identified in Address Y, it may be determined, in step 222, whether timing is still valid for the recorded IP address. If the timing is not valid, that is, the recorded IP address has a LTS since which more than an "Allowed Age" has elapsed, then Packet Y may be from a suspicious origin and the process may branch to step 212.

If the timing is valid for the recorded IP address, Packet Y may be from a legitimate user. Then the LTS for the recorded IP address may be updated in step 224 before Packet Y is routed in step 220.

If, as determined above, Packet Y is a suspicious packet, a warning may be issued in step 212. Then, in step 214, it may be determined whether to keep this IP packet. If the security policy is to drop a suspicious packet without routing it, Packet Y may be discarded in step 216. If, however, the policy favors keeping a suspicious packet, Address Y and Packet Y's LTS value may be recorded in the data store. Next, Packet Y may be routed to its destination.

This exemplary method ends in step 226.

this IP address is still valid. Therefore, the packet with source IP 47.128.185.158 may be routed to its destination. And the LTS associated with IP 47.128.185 may be updated in Table 1 to reflect the more recent time "Tue 11/11/2003 6:55:31 PM." If the timing for IP 47.128.185 is found to be invalid, it may be necessary to discard the packet or route it with a warning.

In a second example, a packet with source IP address "47.222.33.6" arrives at the network router. Again the router may query the data store to determine if any recorded IP address matches IP 47.222.33.6. First, it is determined whether Class A subnet 47 exists in the data store. Yes, the number 47 is found in the "Class A Subnet" fields. Second, it is determined whether Class B subnet 222 exists underneath 47 in the data store hierarchy. No, the number 222 is not found in the "Class B Subnet" field under Class A 47. Therefore, the packet may be from a suspicious sender. Based on the network security policy, the router may either issue a warning and discard the packet, or issue a warning and route the packet. If the packet is routed, the data store may be updated with IP 47.222.33. The number 222 may be entered in a "Class B Subnet" field under Class A 47, and the number 33 may be entered in a "Class C Subnet" field under IP 47.222. The LTS associated with IP 47.222.33 may be entered as the packet's arrival time, which is "Tue 11/11/2003 6:58:12 PM" as shown in Table 1.

It should be appreciated that the technique for tracing source address of packets in accordance with the present invention may be adapted for various communication protocols including but not limited to internet protocol (IP). For tracing source IP addresses, the filtering algorithm need not be limited to IP subnets as described above. The method may be adapted to filter and trace any groups of IP addresses.

Figure 3:
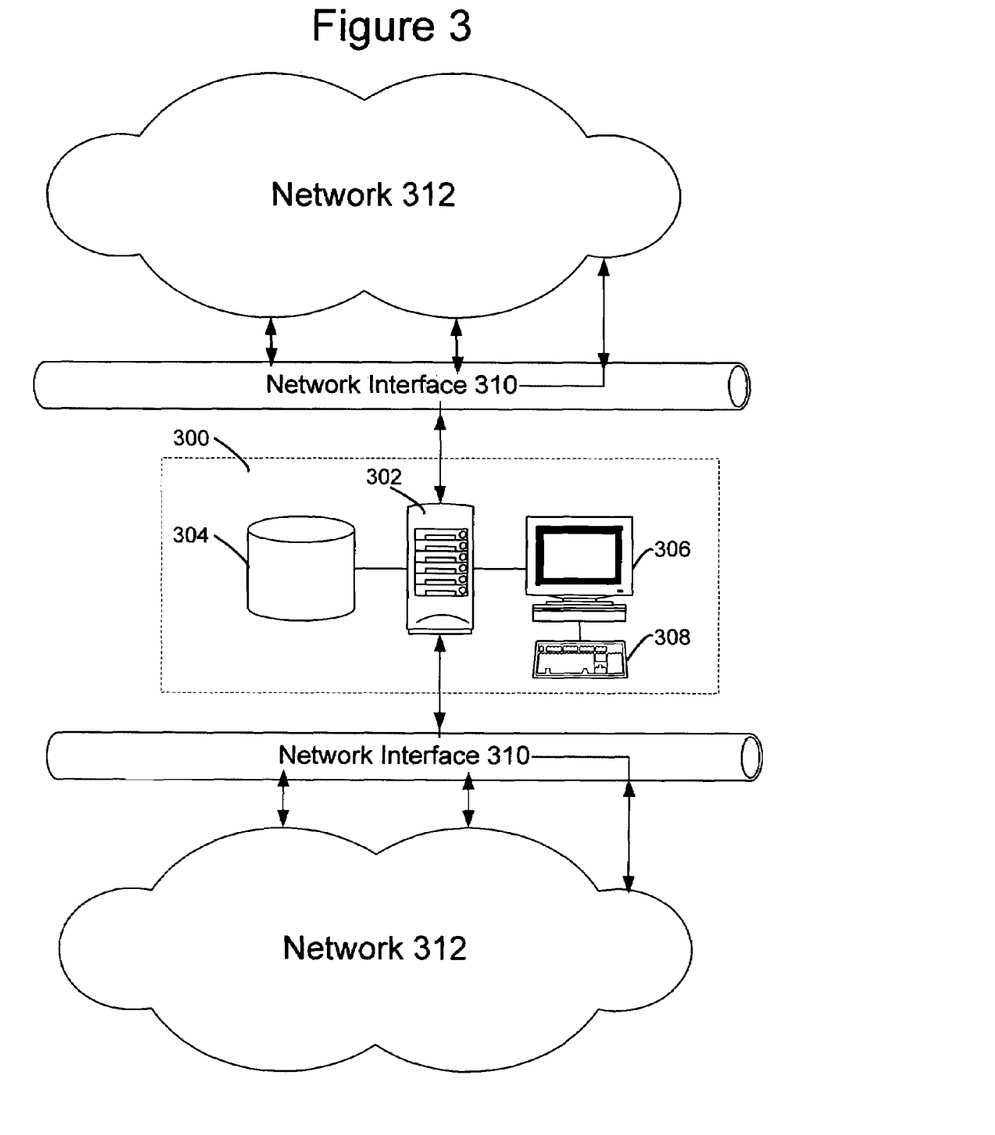
FIG. 3 is a block diagram illustrating an exemplary system for tracing source addresses of packets in accordance with the present invention.

Referring to FIG. 3, there is shown a block diagram illustrating an exemplary system (System 300) for tracing source addresses of packets in accordance with an embodiment of the present invention. System 300 may be any network element, such as a computer, a server, or a content-aware switch/router, that has packet processing and routing functions. System 300 may typically comprise a processor module 302 and a storage module 304. A display module 306 and input module 308 may be optional components in System 300. Processor module 302 may be a central processing unit (CPU), microcontroller, computer or network server that is operatively connected to a network 312 through a network interface 310. Processor module 302 may be capable of communicating with network 312, processing signal packets and routing signal packets. Storage module 304 may be a storage device, such as a semiconductor memory, nonvolatile memory, hard drive disk, CD-ROM or similar, that is accessible by processor module 302. Storage module 304 may hold a data store of source addresses and LTS records of signal packets that have been received by processor module 302. Whenever a packet from network 312 arrives at System 300, processor module 302 may identify the packet's source address, query the data store in storage module 304, determine the legitimacy of the packet's source, and take action based on the legitimacy determination in accordance with the invention as described above.

The technique for tracing source addresses of packets in accordance with the present invention as described above may be implemented on a variety of network elements as a security feature, on top of which additional tools may be built to integrate with intrusion detection systems (IDS's) and network monitoring systems. The technique in accordance with the invention allows logging, alerting and/or disposal of suspect network traffic with minimal overhead cost. This technique may produce no false positives except when new subnets are added to the source networks or when a router failure causes previously unseen packet routing, both of which happen rarely during an extensive time period. As a result, an efficient solution is provided for traceability and/or black-holing of DDoS attack traffic with minimal network impact.

At this point it should be noted that the technique for tracing source addresses of packets in accordance with the present invention as described above typically involves the processing of input data and the generation of output data to some extent. This input data processing and output data generation may be implemented in hardware or software. For example, specific electronic components may be employed in a computer and/or communications network or similar or related circuitry for implementing the functions associated with source address tracing in accordance with the present invention as described above. Alternatively, one or more processors operating in accordance with stored instructions may implement the functions associated with source address tracing in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for tracing source addresses of packets, the method comprising:
    receiving a current packet at a first network element;
    identifying at least part of a source address of the current packet;
    querying a storage module of the first network element to identify at least one source address of a previously received packet, wherein the at least one source address of the previously received packet is recorded in a hierarchical data structure and the hierarchical data structure is based at least in part on a plurality of classes of subnets;
    determining whether the at least part of the source address of the current packet matches at least part of the at least one source address of the previously received packet; and
    routing the current packet to a second network element if the at least part of the source address of the current packet matches at least part of the at least one source address of the previously received packet.

2. The method according to claim 1, where a Last Time Seen (LTS) value associated with each of the at least one source address of the previously received packet is recorded.

3. The method according to claim 1, further comprising:
    recording an arrival time of the packet.

4. The method according to claim 1, further comprising:
    routing the current packet to the second network element with a warning if the at least part of the source address of the current packet does not match at least part of the at least one source address of the previously received packet; and
    recording the at least part of the source address of the current packet and reception time of the current packet.

5. The method according to claim 4, where the warning is recorded in a read-only medium.

6. The method according to claim 1, further comprising issuing a warning and discarding the current packet if the at least part of the source address of the current packet does not match at least part of the at least one source address of the previously received packet.

7. The method according to claim 6, where the warning is recorded in a read-only medium.

8. The method according to claim 1, where the source address of the current packet is an internet protocol (IP) address.

9. At least one processor readable storage medium for storing a computer program of instructions configured to be readable by at least one processor for instructing the at least one processor to execute a computer process for performing the method as recited in claim 1.

10. The method according to claim 1, wherein the at least one source address of the previously received packet is recorded within a predetermined time period prior to receiving the current packet.

11. The method according to claim 1, wherein the plurality of classes of subnets comprises at least one of a class A subnet, a class B subnet, and a class C subnet, wherein the class A subnet comprises a first octet of the at least one source address recorded, the class B subnet comprises a second octet of the at least one source address recorded, and the class C subnet comprises a third octet of the at least one source address recorded.

12. The method according to claim 11, wherein determining whether the at least part of the source address of the current packet matches at least part of the at least one source address of the previously received packet comprises comparing the at least part of the source address of the current packet with at least one of the plurality of classes of subnets of the at least one source address of the previously received packet.

13. A system for tracing source addresses of packets comprising a first network element for receiving a current packet, where the first network element comprises:
   a processor module that identifies at least part of a source address of the current packet, queries to identify at least one source address of a previously received packet, wherein the at least one source address of the previously received packet is recorded in a hierarchical data structure and the hierarchical data structure comprises a plurality of classes of subnets, determines whether the at least part of the source address of the current packet matches at least part of the at least one source address of the previously received packet, and routes the current packet to a second network element if the at least part of the source address of the current packet matches at least part of the at least one source address of the previously received packet; and
   a storage module that stores the at least one source address of the previously received packet.

14. The system according to claim 13, where a Last Time Seen (LTS) value associated with each of the at least one source address of the previously received packet is recorded.

15. The system according to claim 13, where the processor module is further adapted to record reception time of the current packet.

16. The system according to claim 13, where the processor module is further adapted to:
   route the current packet to the second network element with a warning if the at least part of the source address of the current packet does not match at least part of the at least one source address of the previously received packet; and
   record the at least part of the source address of the current packet and reception time of the current packet.

17. The system according to claim 16, where the warning is recorded in a read-only medium.

18. The system according to claim 13, where the processor module is further adapted to issue a warning and discard the current packet if the at least part of the source address of the current packet does not match at least part of the at least one source address of the previously received packet.

19. The system according to claim 18, where the warning is recorded in a read-only medium.

20. The system according to claim 13, where the source address of the current packet is an internet protocol (IP) address.

21. A system for tracing source addresses of packets, the system comprising:
   means for receiving a current packet at a first network element;
   means for identifying at least part of a source address of the current packet;
   means for querying a storage module to identify at least one source address of a previously received packet, wherein the at least one source address of the previously received packet is recorded in a hierarchical data structure and the hierarchical data structure comprises a plurality of classes of subnets;
   means for determining whether the at least part of the source address of the current packet matches at least part of the at least one source address of the previously received packet; and
   means for routing the current packet to a second network element if the at least part of the source address of the current packet matches at least part of the at least one source address of the previously received packet.

* * * * *

UNITED STATES PATENT AND TRADEMARK OFFICE
CERTIFICATE OF CORRECTION

PATENT NO. : 7,613,179 B2 Page 1 of 1
APPLICATION NO. : 10/721335
DATED : November 3, 2009
INVENTOR(S) : Martin Soukup It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1154 days.

Signed and Sealed this

Nineteenth Day of October, 2010

David J. Kappos
*Director of the United States Patent and Trademark Office*